United States Patent [19]

Kerr et al.

[11] Patent Number: 4,616,320

[45] Date of Patent: Oct. 7, 1986

[54] SEISMIC STRONG-MOTION RECORDER

[75] Inventors: James D. Kerr, Allen; Howard Thompson, Dallas, both of Tex.

[73] Assignee: Teledyne Industries Inc., Los Angeles, Calif.

[21] Appl. No.: 588,633

[22] Filed: Mar. 12, 1984

[51] Int. Cl.$^4$ .......................... G06F 15/20; G01V 1/00
[52] U.S. Cl. ..................................... 364/421; 340/690;
346/33 C; 364/420
[58] Field of Search ......................... 364/400, 420–422;
367/14, 21, 59–60, 74, 76; 340/690; 33/1 HH;
346/7, 33 R, 33 C

[56] References Cited

U.S. PATENT DOCUMENTS

| | | | |
|---|---|---|---|
| 3,333,247 | 7/1967 | Hadley et al. | 364/421 X |
| 3,506,957 | 4/1970 | Davison | 340/690 X |
| 3,517,316 | 6/1970 | Anderson et al. | 364/421 X |
| 3,535,501 | 10/1970 | Porter, Jr. | 364/421 X |
| 3,790,925 | 2/1974 | Abreus | 340/3 R |
| 3,950,759 | 4/1976 | Ziegenfuss | 346/33 R |
| 3,990,036 | 11/1976 | Savit | 340/15.5 TS |
| 4,300,135 | 10/1981 | Korn et al. | 340/690 |
| 4,323,990 | 4/1982 | Goode et al. | 367/21 |
| 4,409,670 | 10/1983 | Herndon | 364/900 |
| 4,484,186 | 11/1984 | Wood et al. | 340/690 X |
| 4,528,559 | 7/1985 | Freeman | 340/690 |
| 4,561,074 | 12/1985 | Warmack | 364/421 X |

Primary Examiner—Gary V. Harkcom
Attorney, Agent, or Firm—Dowell & Dowell

[57] ABSTRACT

A digital recorder and method for digitizing and recording seismic events, the recorder being capable of lengthy stand-by periods during which it records lesser events of little interest in a static buffer and then displaces these events with more recent events when the static buffer is full. The recorder is self powered and controlled by a microprocessor to transfer strong-motion signals representing important seismic events from the static buffer into a static memory which is kept alive by suitable back-up batteries and comprises a cartridge separable and retrievable from the recorder after a major seismic event. The information in the recorder also is accessible through a serial port for reading out to a central data processor. The seismic information is specially compressed and formatted to increase the amount of data recorded by eliminating data that is essentially redundant. The recorder comprises a package designed to protect the electronic circuitry and three orthogonally arranged seismometers in a sealed compartment, and to house the power supply including rechargeable batteries in an easily accessible vented compartment.

17 Claims, 8 Drawing Figures

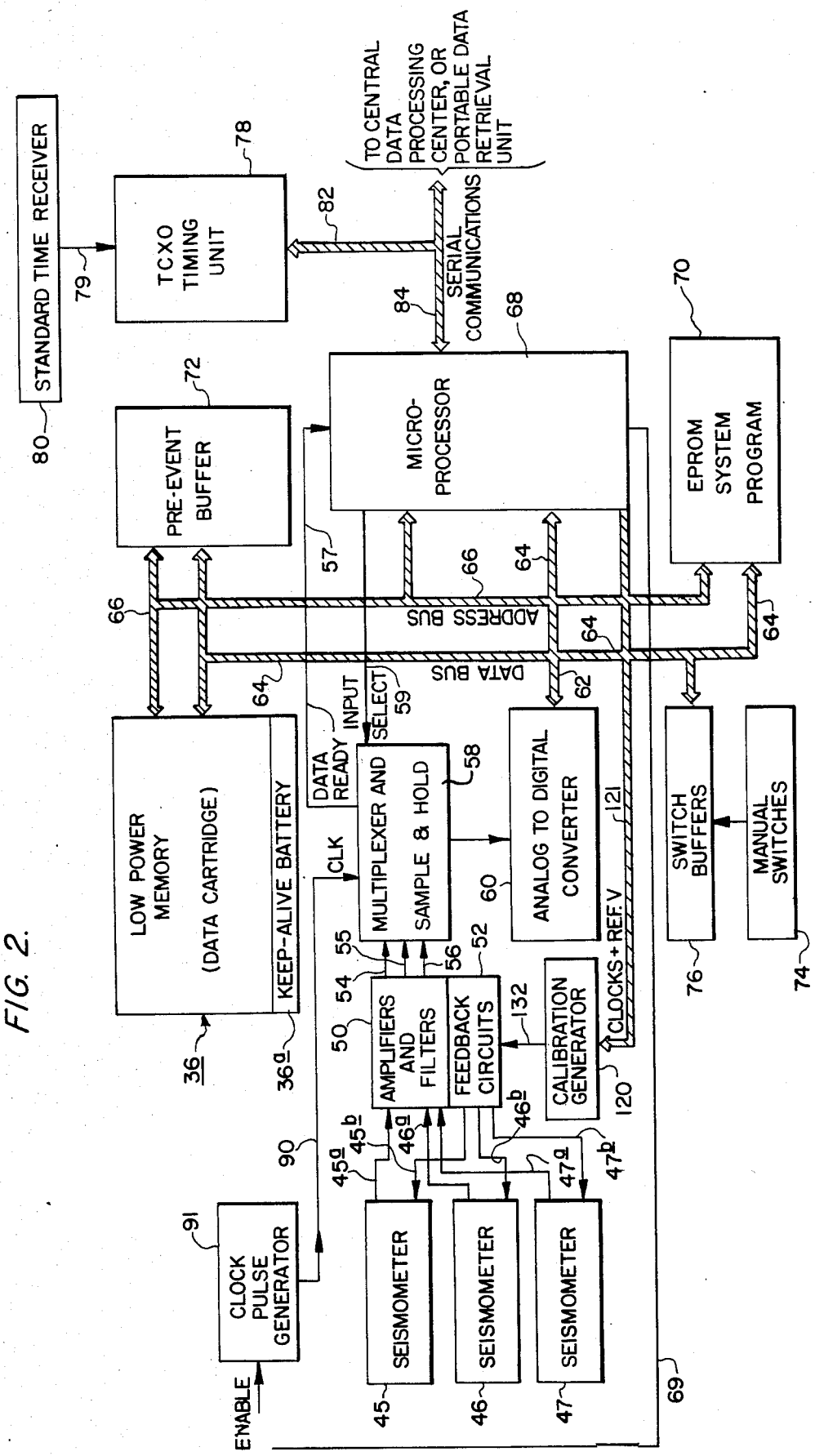

SEISMIC STRONG-MOTION RECORDER

BACKGROUND AND PRIOR ART

In view of the fact that earthquakes occur suddenly and generally without much warning, it is necessary for recorders designed to record the occurrence of sesimic events to be continuously operational and fully prepared to record even the beginnings of the seismic signatures. For this reason mechanical recorders have proven impractical. Not only do such machines tend to fail to function properly after many months of non-operation, but in every case their response time to the sudden discontinuity between a long period of dormancy and the requirement of immediate precise recording of an event is so slow that the elapsed time required to bring up to speed a recording medium, such as a photographic film or magnetic tape, usually results in the loss of the beginning of the seismic signature of interest. Conversely, the storage of digitized data in active electronic memory chips involves no moving parts and therefore results in no start-up loss of the initial portions of an event of interest. This type of storage can be done in such a way that all seismic events are continuously recorded, with events of no interest being written-over by newly occurring events until an event of real interest occurs, at which time the record of such an event is transferred to an electronic memory where it is retained rather than being written-over by subsequent events. There are no moving parts except within the three orthogonal seismometers themselves.

U.S. Pat. No. 4,409,670 to Herndon shows a digital flight-data recorder which receives and temporarily stores multiple diverse digitized flight parameters, the system compressing and more permanently storing those data frames which contain flight parameters which are of significant interest, the data being compressed and formatted to achieve a smaller recorded data base. This patent uses a compression scheme differing fundamentally from that of the present invention.

U.S. Pat. No. 3,990,036 to Savit shows seismic data being collected and held in digital storage registers at each of a number of remote sensor stations and then collected by polling the stations from a central processor.

U.S. Pat. No. 3,790,925 to Ahrens shows a digital store used in an echo sounder and subsequently read out when required.

In U.S. Pat. No. 4,323,990 to Goode et al, seismometer signals are digitized by an A/D converter and specially formatted for recording, but the recording is on magnetic tape, even for short-term storage, and thus would suffer from most of the mechanical disadvantages related above when used in a system that continously monitors for earthquakes, month after month.

The U.S. Pat. No. 4,300,135, to Korn et al, shows an earthquake monitoring system using a microprocessor, but this circuit triggers an alarm rather than recording the signature of the quake.

THE INVENTION

This invention relates to a digital recorder for digitizing and recording seismic events, the recorder being capable of lengthy stand-by periods during which it filters and formats and enters into a static buffer all events as they occur, most of which are of little interest, and which events are temporarily retained in the static buffer. These buffer-retained signals are displaced by more recent events when the static buffer is full, the recorder being self powered and controlled by a programmed microprocessor to transfer buffer-retained high amplitude signatures representing important seismic events from the static buffer into a static memory which is kept alive by suitable back-up batteries and in one embodiment comprises a cartridge separable and retrievable from the recorder after a major seismic event. The data is compressed before storage by a unique compression and formatting technique. The information recorded in the memory is accessible upon interrogation through a serial port for reading out to a central data processor or to a portable data retrieval unit. The recorder includes calibrating means for displacing the seismometers to generate calibrating signals which will test the entire system, and includes manual switch means for entering for recording purposes along with the seismic data information such as unit identification, and for entering numerical parameters serving as system standards, i.e. sensitivity, trigger level, buffer recording time, reference voltage, and sampling rate. A temperature controlled crystal oscillator, which is periodically synchronized to an outside time standard, provides accurate time codes which are stored along with the seismic signatures to show their times of occurrence. The recorder is packaged within a sealed compartment to protect the electronic circuitry and three associated orthogonally arranged seismometers, and the recorder also includes a separate vented compartment to house the various components of the power supply including rechargeable batteries.

OBJECTS AND ADVANTAGES OF THE INVENTION

It is a principal object of this invention to provide an improved recorder of seismic vibrations caused by nearby earthquakes for the purpose of monitoring the structural excursions of buildings, dams, bridges, etc. in response to such quakes, the information being especially useful to seismologists and engineers for assessing damage and for preparing design codes and rules for new construction. It is a major object to provide a microprocessor-controlled recorder for attachment to a component of a structure which will move with the earth, the recorder having the capability of multiplexing and recording in three channels components of motion in three orthogonal directions, and being responsive within a passband of about 0.016 to 65 Hz with amplitudes from 0.00125 g peak to about 5 g peak.

It is another primary object of the invention to provide a strong-motion recorder for recording vibrations measured by analog transducers to produce three orthogonal channel signals which are then digitized and formatted and recorded as digital sequences in microprocessor-controlled active semiconductor devices, or other equivalent memory devices. The recorder has no moving parts whereby to achieve very fast response time to the data, very low power consumption, and the ability to store pre-event data in a buffer which can be written-over until an event of interest having an amplitude exceeding a preset level occurs, whereupon the recorder is triggered to transfer the signature of interest from the buffer to a larger electronic memory where it is stored for later access. The advantage of the digital semiconductor memory is that it is capable of remaining dormant for long periods of time and then responding instantly to achieve the immediate and precise recording of a seismic event of interest. Maintenance is virtually eliminated by the elimination of moving parts, such as motors, potentiometers, etc, and the present recorder does not require leveling because the seismometers used have no DC output component and therefore have no gravity-initiated constant output components.

It is another object of the invention to filter the seismometer signals for the three channels before digitizing thereof, the signal filters having notches in their characteristics at the digital sampling rate frequency to discourage aliasing and comprising low-pass active filters with about 24 dB per octave rejection at the upper end of the pass characteristic.

A major object of the invention is to provide two static electronic memory devices including a pre-event buffer which receives and stores all events but is continuously written-over by newly occurring events, and including a static memory which has a much larger storage capability and is never written-over. All events, after filtering, digitizing and formatting by the microprocessor program, are stored in the twelve-bit pre-event buffer which has an eight-second storage capability. As new events arrive, they displace previously stored events in the pre-event buffer. When an event of importance arrives, i.e. an event having sufficient amplitude to exceed a trigger threshold, its signature is compressed and transferred from the pre-event buffer into the static memory for permanent storage. This memory has about a 20 minute storage capacity and will store events having sufficient amplitude to operate the trigger until it is full. When the trigger threshold is exceeded, the contents of the pre-event buffer are transferred to the memory and the in-coming event signature continues to be inserted in the pre-event buffer and transferred to the memory until its level has failed to exceed the threshold for a certain number of seconds as determined by the setting of one of the aforementioned manual switch means. A principal virtue of the pre-event buffer is that the usual seismic signature does not reach its full amplitude immediately and therefore in the usual case would not exceed the trigger threshold until part of the event has passed. However, since the early portion of the signature is already retained in the pre-event buffer, and since all transfer to the main memory is from the buffer, the early portion of the signature of interest which is in the pre-event buffer at the time that transfer is initiated will not be lost, but will be transferred to the main memory along with the remainder of the signature.

Another major object of the invention is to provide a data compression system for reducing the size of the stored data base by eliminating from recording those data points which are redundant. The present system achieves such compression by monitoring the present slope of the signature being digitized and by "predicting" the slope of the next adjacent portion of the signature. When a subsequent data point falls outside the "predicted" slope by exceeding a predetermined acceptable plus-or-minus tolerance, the last data point still falling within that tolerance is recorded along with a redundancy count of how many points were eliminated as being within that tolerance, and a new slope is established using the last recorded point and the latest point which fell outside the tolerance established for the previous slope.

Still another major object of the invention is to provide the main memory in the form of a cartridge which is removable from the recorder as a separable module. This memory cartridge has its own keep-alive battery within it to keep the memory active while the cartridge is detached or in the event that the power supply in the recorder should become inoperative.

A further object of the invention is to provide multiple switches on the recorder which can be manually adjusted to enter into storage such codes as recorder unit identification, trigger threshold, sensitivity, recording time after the signal falls below the threshold, a reference voltage, and digital sampling rate, all of these settings being recorded along with the seismic data.

Another primary object of the invention is to provide very accurate time encodements which are formatted and stored along with the seismic signals so that the exact time the signals occurred can be determined from the stored signatures. For this purpose a temperature controlled crystal oscillator is provided which can be periodically connected to a source of standard time signals to be automatically synchronized thereby. In addition, a precision voltage source is provided for delivering a coded reference signal for storage with the seismic signatures for use as an amplitude reference to permit the removal of any amplifier offsets introduced by the active filters. Like the time codes, the amplitude references are part of the seismic signal format stored in the main memory cartridge, and can be associated with the signature when it is analyzed.

A further object of the invention is to provide a calibration system which can generate a sine wave and deliver it to the feed-back coils of the three seismometers so as to artificially generate a displacement thereof for the purpose of simulating a seismic event. As a result of such artificial actuation of the seismometers the entire filtering, digitizing, formatting and storage system of the recorder is effectively put through its functions and the response of the whole system to an event of accurately pre-determined character is monitored, whereby the entire system can be tested.

Another very important feature of the invention is to provide a serial port for accessing the recorder, the port being connectible with a central processing system which can interrogate the recorder, and others like it in an associated network. Upon interrogation the recorder will read out from memory its recorded signatures, time codes, reference signal codes, and its own identification through the serial port for remote collection and processing. Alternatively a portable data retrieval unit can be coupled to the recorder for receiving its data and/or monitoring its internal condition including its power supplies. Either system provides a convenient method of collecting data from plural recorders in the network. Usually, serial-port accessing is more easily done than collecting the stored data by physically removing the memory cartridges from each of the recorders in a network thereof. However, in the event of a major disaster, physical retrieval of the memory cartridges might be the only way of recovering data.

The power supply for the recorder comprises a main battery which is normally maintained in a state of full charge by power from an outside source, such as city power mains or solar panels or some other suitable source, so that upon failure of the outside source the system will keep going on its internal main battery for a long period of time, the keep-alive battery in the memory cartridge being separate from the main battery and operating only when the cartridge is disconnected from the recorder or when all other power sources fail. A transistor switching circuit controlled by the microprocessor operates on an emergency basis to connect all remaining power in the recorder to the cartridge memory exclusively, in the event that the main battery begins to fail, for example, due to failure of its external recharging source. In this way, the ultra-low-drain main memory can be kept alive for a long period of time, such as one year.

Another important object of the invention is to provide an improved housing for the recorder wherein the seismometers, microprocessor, electronic circuitry, and pre-event buffer are contained within a sealed compartment which protects them from damage and ambient atmospheric conditions, and wherein the power supply system including the rechargeable battery and its charging circuit are contained within a vented compartment which can be locked to prevent tampering. The main memory module is also contained within the locked vented compartment so that it can be easily removed and/or replaced without having to open the sealed compartment. The keep-alive battery for the cartridge is mounted within the separable module. To facilitate access to the power supply and the main battery and the cartridge, the locked vented compartment is located on top of the sealed compartment which normally requires no access since there is no maintenance required for the components contained therein.

Other objects and advantages of the invention will become apparent during the discussion of the drawings showing a preferred embodiment of the invention.

THE DRAWINGS

FIG. 2 is a block diagram showing the recording system;

DESCRIPTION OF PREFERRED EMBODIMENT

Figure 1:
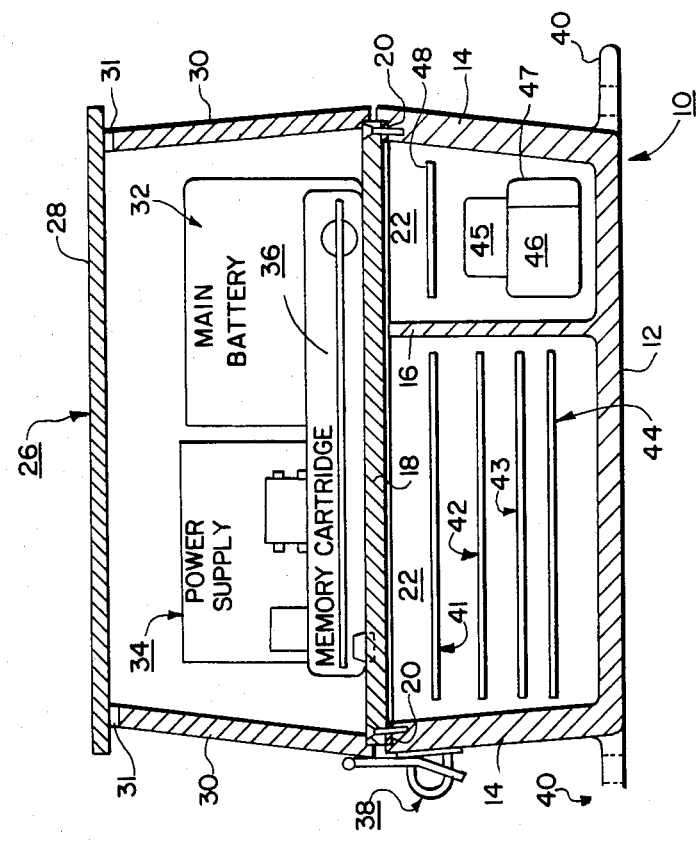
FIG. 1 is a sectional view through the strong-motion recorder housing showing the positioning of the various components in different compartments.

Referring now to FIG. 1, the recorder is housed within a housing which comprises a lower housing member in the form of a casting 10 having a bottom 12, sides 14, and an upright separator 16. A partition plate 18 closes the lower casting 10 and seals it against an O-ring 20 supported in a groove around the upper periphery of the sides 14, thereby forming an hermetically sealed lower compartment 22. An upper housing member 26 provides a compartment 24 located above the partition plate 18 and takes the form of a vented cover casting comprising a top 28 having downwardly extending sides 30. The cover casting 26 is readily removable from the partition plate 18 so as to permit easy access to the main battery 32 and power supply 34 and memory cartridge 36 contained therein. The upper compartment 24 is vented at 31 to permit the escape of gases given off as a result of charging of the battery 32. The partition plate 18 can be screwed to the lower casting to maintain the hermetic seal therewithin by avoiding accidental separation of the plate 18 from the O-ring seal 20 when the cover casting 26 is opened. It is usually undesirable to open the lower compartment, because the electronic circuitry and seismometers within the sealed compartment 22 do not normally require any servicing and should be protected against unnecessary handling. Closure devices such as the hasp assembly 38 are provided to receive a lock and prevent unauthorized removal of the cover and tampering with the contents of the housing. The lower casting has feet 40 attached thereto to facilitate bolting of the housing to a structure whose motions it is intended to monitor.

Within the lower sealed compartment 22 there are four circuit boards 41, 42, 43, and 44 which mount various electronic components such as a microprocessor, a pre-event buffer, a PROM program, timing and clock circuitry and interface circuits as will be discussed hereinafter in connection with FIG. 2. The sealed compartment 22 also includes orthogonally mounted seismometers 45, 46 and 47 and a circuit board 48 mounting the components of the seismometer filters, amplifiers and calibration generator as will be discussed in connection with FIGS. 2 and 3 below.

Figure 3:
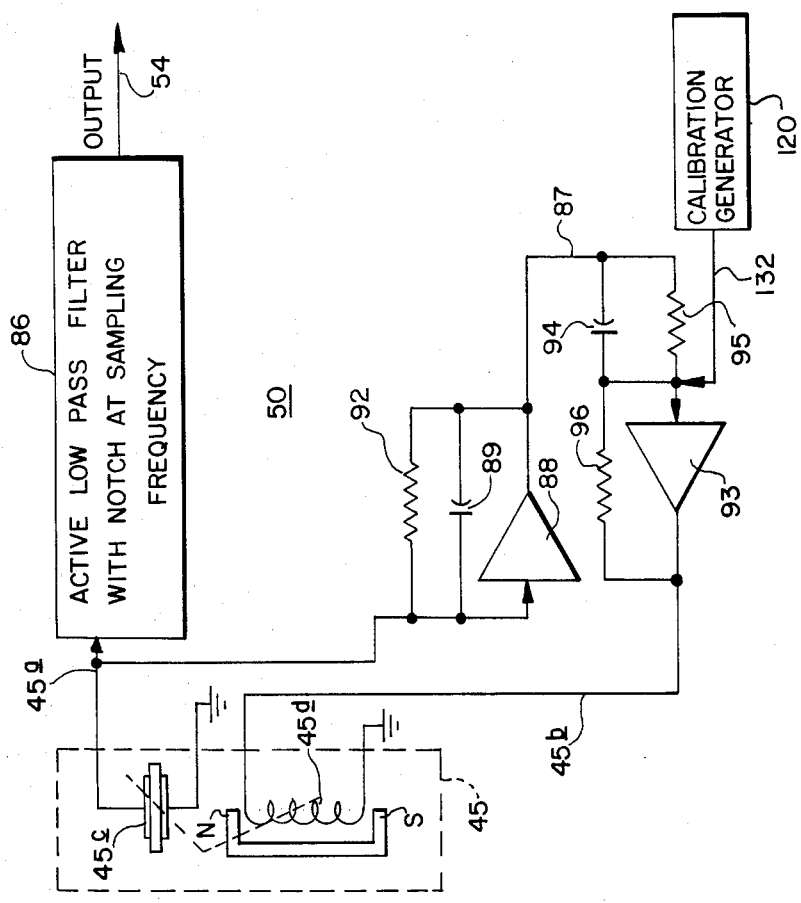
FIG. 3 is a diagram schematically showing one of the three orthogonally disposed seismometers, and the filter and amplifier and feedback circuitry associated with that seismometer, the other two seismometers being similar and having similar circuitry attached thereto.

Referring now to FIG. 2, three seismometers 45, 46 and 47, which are mounted orthogonally as shown in FIG. 1, respectively have outputs 45a, 46a, and 47a which are connected into three identical amplifier and filter circuits represented by the block 50. Some of the output from each of these three amplifier circuits in block 50 is fed back through three identical feedback circuits respresented by the block 52 and delivered to windings in the seismometers through wires 45b, 46b and 47b. Each of these seismometer filter, amplifier and feedback circuits is the same as the others and a typical specific circuitry for one seismometer is shown in more detail in FIG. 3. Much of the circuitry of FIG. 3 is very similar to the seismometer and circuitry disclosed and claimed in our co-pending application for patent entitled "Force-Balance Accelerometer System", U.S. Ser. No. 06/537,756, filed Sept. 30, 1983, now U.S. Pat. No. 4,473,768.

The filtered and amplified outputs, comprising three separate seismometer signal channels, are fed through wires 54, 55 and 56 to a multiplexer and sample-and-hold circuit 58 which delivers a data-ready signal on wire 57 to the microprocessor which then actuates the multiplexer by its input select wire 59 to deliver seismic signals from the seismometer channels sequentially to an analog/digital converter 60 whose output is delivered on wires 62 to the main data bus 64 of a microprocessor 68 which is programmed by an EPROM system program 70. The sampling rate of the track-and-hold circuit 58 is clocked by pulses on wire 90 from a clock pulse generator 91 which is enabled by the microprocessor 68 through wire 69. The microprocessor and EPROM are also coupled to an address bus 66 in a manner well known in the microprocessor art.

The data appearing on the data bus 64 as digitized by the A/D converter 60, is formatted by the microprocessor 68 in a manner to be described hereinafter, and is initially stored under control of the microprocessor and EPROM in a pre-event buffer 72 which has three channels of storage for the data derived from the three seismometers 45, 46 and 47. Storage in the three channels of the pre-event buffer is synchronized with the multiplexer 58. The pre-event buffer comprises active CMOS RAM memory chips capable of storing data and addresses for eight seconds worth of digitized seismometer events in its three separate channels. When it is full, subsequent incoming events write-over pre-stored events which are then lost. The sampling rate in each channel for digitizing purposes is 200 Hz.

The pre-event buffer stores more than signal data and addresses. It also stores in association with such data certain other information, most of which comes from a series of manual switches represented by the box 74 which switches insert entries into the switch buffers 76. This information includes an identification code for this particular Strong-Motion Recorder unit, a selectible seismometer signal sampling rate, the sensitivity of the amplifiers, a trigger threshold level of the seismometer signal which when exceeded will initiate the transfer of data from the pre-event buffer 72 into the memory cartridge 36, a buffer recording time duration, and a signal amplitude calibration reference voltage. Accurate time signal codes showing the exact time that a seismometer event was stored in the pre-event buffer are also recorded as hereinafter described.

The latter coded time signals are provided by an accurate temperature compensated crystal oscillator timing unit 78 which has an input 79 that can be coupled to receive standard time signals from a standard time receiver 80, the crystal oscillator then synchronizing itself to the received time signals. The crystal oscillator timing unit 78 generates time code signals which it delivers on cable 82 connected to cable 84 coming from the serial communications port for the microprocessor 68. These coded time signals are stored along with the data from the seismometers in the pre-event buffer. When the amplitude of the seismometer signal exceeds the trigger level set by the manual switches 74, the microprocessor transfers the contents of the pre-event buffer 72 to the memory cartridge 36 for more permanent storage.

The serial communications cable 84 can be connected either to a central data acquisition and processing center which can interrogate each recorder in a network by its identification code to recover from the various recorders the stored data in the memory cartridges, or alternatively the communications cable 84 can be connected to a portable data retrieval unit (not shown) which can be carried from one recorder unit to the next to retrieve data from each without removal of the memory modules therefrom. However, it is also contemplated to recover data from the cartridge 36 by removing it from the recorder and taking it to a processing center for insertion into the data bank, and then replacing the removed cartridge with a fresh one. Since the memory cartridge 36 is also an active electronic memory, the cartridge contains its own keep-alive battery 36a which permits its separation from the main power supply in the recorder without loss of data. When the contents of the cartridge have been transferred to the data bank, the cartridge can be reset by interruption of power to its active chips.

Referring now to FIG. 3 which shows a typical seismometer having associated filter and amplifier circuits, a force-balance feedback path to the seismometer winding, and connection to a calibration circuit, this figure includes a typical one of the seismometers, referenced 45 and having a proof-mass supporting a piezoelectric transducer 45c and a feedback winding 45d cooperating with a fixed magnetic field and serving to damp the proof-mass deflections and to restore centering. The output of the transducer 45c is coupled through wire 45a to a filter circuit 86 and also to a charge amplifier 88, the resistor 92 and capacitor 89 being part of the conventional charge amplifier. The filter 86 is a low-pass filter having an upper cut-off at about 65 Hz, and also has a deep notch at 200 Hz, the digital sampling frequency, to suppress aliasing. The output 54 of the filter 86 is connected to the multiplexer 58.

The output of the charge amplifier at 87 goes to the input of a feedback amplifier 93, the output of which drives the feedback winding 45d of the seismometer through the wire 45b. The input of the feedback amplifier 93 is connected to the output 87 of the charge amplifier 88 by a coupling capacitor 94 and a resistor 95, and the gain of the feedback amplifier 93 is fixed by a resistor 96. The feedback amplifier 93 is therefore driven by two components of the output signal at 87. The component coupled by the resistor 95 is proportional to the displacement of the proof-mass and therefore produces a component of current in the feedback amplifier which serves to produce in the winding a proof-mass restoring force. The other component driving the feedback amplifier 93 through the capacitor 94 is proportional to velocity of displacement of the proof-mass and therefore produces a feedback component of current in the winding 45d which exerts a damping force on the the proof-mass opposing oscillation thereof at its closed-loop resonant frequency. The feedback operation is explained in greater detail in our above-mentioned co-pending application for patent entitled "Force-Balance Accelerometer System".

Figure 4:
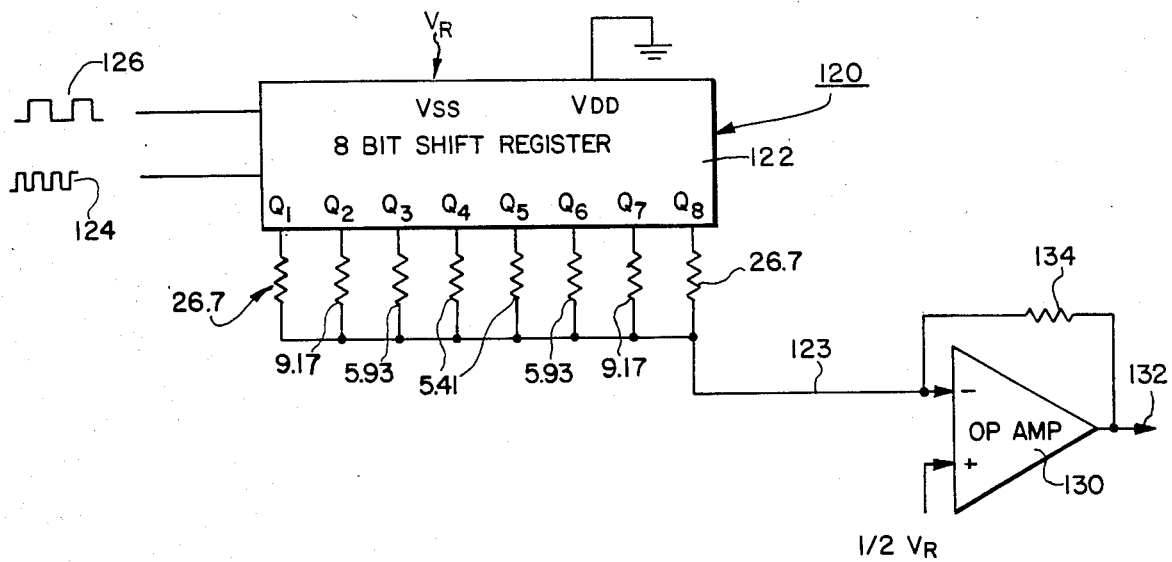
FIG. 4 is a diagram of a system calibration generator.
Figure 5:
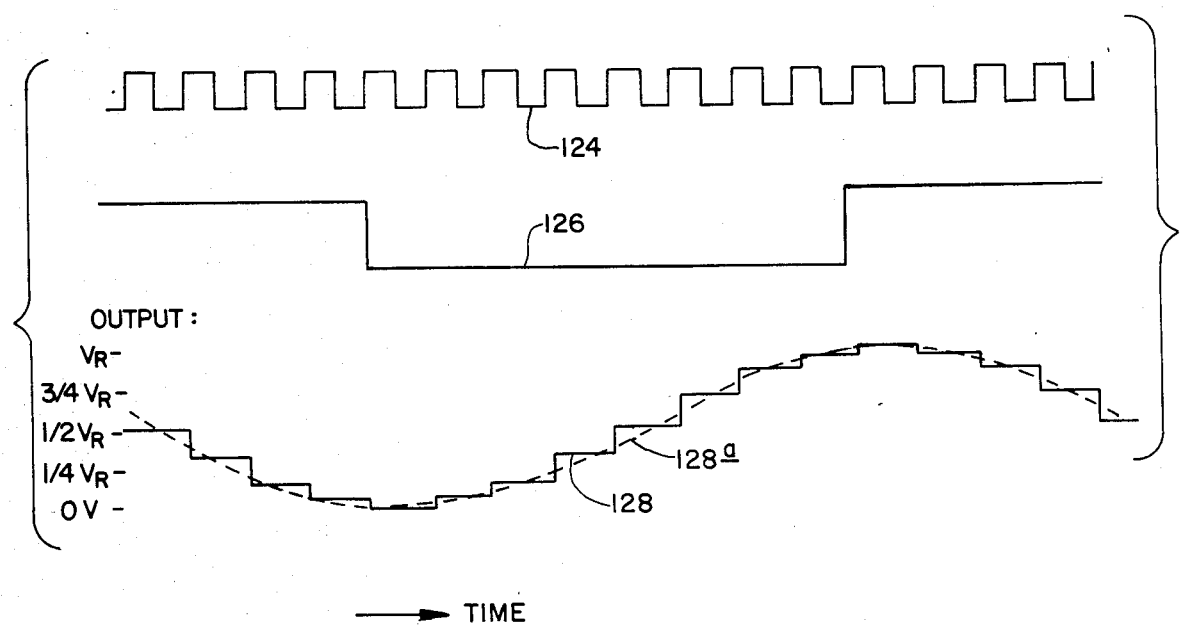
FIG. 5 is a diagram showing three waveforms relating to the calibration generator.

A calibration generator 120 is shown schematically in FIG. 4 and is shown in block diagram form in FIGS. 2 and 3. The purpose of this calibration generator is to generate a substantially sinusoidal waveform as shown in FIG. 5 to artificially displace all three seismometers through an accurately predetermined displacement, whereby the response thereof and the response of all of the electronic circuitry in the recorder can be checked. It is, therefore, important that the calibration waveform be highly repeatable. For this purpose an eight-bit shift register 122 is driven by two square-wave clock pulse inputs including data clock pulses 124 and shift clock pulses 126 as shown in FIG. 5. These clock inputs are delivered to the calibrator circuit 120 through a cable 121 coming from the microprocessor 68, FIG. 2. Series of signals are stepped through the shift register 122 in response to the clock pulses 124 applied to its clock terminal. The Q outputs of the register 122 are ganged together at wire 123 which therefore carries a stepped substantially sinusoidal waveform 128 as shown in FIG. 5. This waveform is delivered from the eight stages Q1-Q8 through resistances having ratios as shown in FIG. 4 so that the stepped waveform 128 results. The other square wave 126 is inserted at the shift register D terminal and reverses every eight pulses of the waveform 124 so as to determine alternate half cycles of the stepped waveform 128. In addition, a steady state reference voltage $V_R$ is applied through the cable 121 from the microprocessor to the $V_{ss}$ terminal of the shift register 122. This reference voltage $V_R$ determines by its amplitude the magnitude of the waveform 128, so that the magnitude of the calibrating displacement of the seismometers can be set by adjusting the level of the reference voltage using the manual switches 74, FIG. 2. The output from the shift register 122 on wire 123 is coupled to the negative input of an operational amplifier 130 whose positive input is returned to one-half the reference voltage $V_R$ so that the waveform 128 appearing at wire 132 lies tangent to the zero axis at its lowermost points. A resistor 134 sets the gain of the amplifier 130. The clock rate of the waveform 124 is chosen with respect to the natural closed-loop resonant frequency of the seismometers such that the stepped nature of the waveform 128 is not followed by the seismometers, which instead respond as though a true sinusiod 128a were being introduced to deflect them. The output on wire 132 is coupled to drive the feedback amplifiers 114 of all three of the seismometers simultaneously in the manner shown in FIG. 4.

Figure 6:
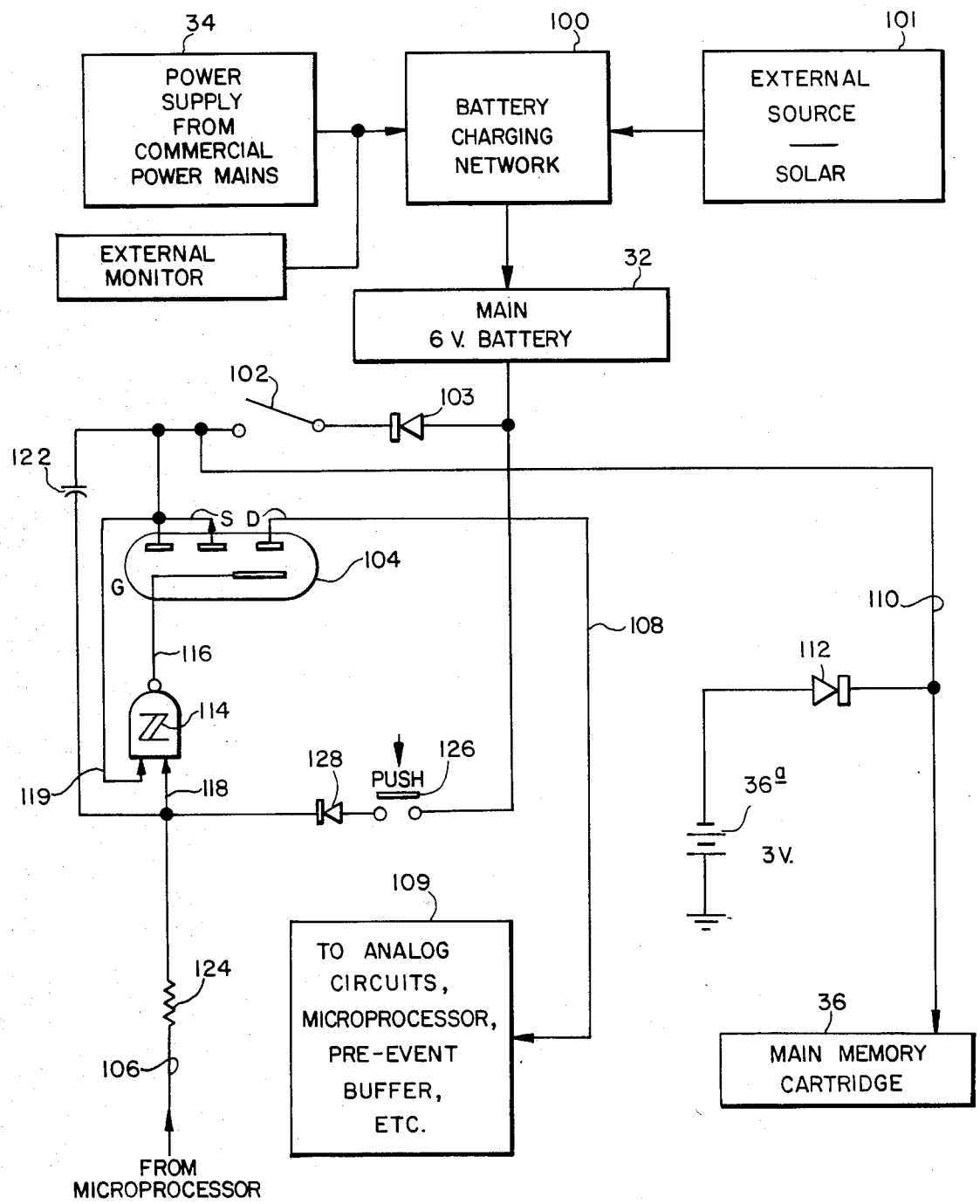
FIG. 6 is a diagram showing the recorder power supply.

FIG. 6 shows the main power supply to the recorder. It includes a six-volt main battery 32 with a charging network 100 which normally connects a power supply 34, powered from commercial power mains, to the battery 32 so that the battery can be kept fully charged. However, other power sources can also be used where commercial power is unavailable. For example, the network 100 can be used to couple the battery 32 to some external local source 101 which light comprise a larger battery, a windmill generator, solar cells, etc. The main power for the recorder system is taken from the battery 32 through a main power switch 102 and an isolation diode 103. When the switch 102 is closed power from the battery can pass through a transistor switch 104, when conductive, and be connected via the wire 108 to almost the entire recorder system represented by the box 109, which however does not include the memory cartridge 36. The transistor switch 104 receives power from the battery at its source S via the switch 102 and delivers the power through its drain D to the wire 108 when its gate G is enabled by a low signal thereon. This low signal persists as long as a high is applied to the wire 106 from the microprocessor 68, which occurs whenever the supply voltage from the battery 32 exceeds 4.5 volts. However, if the battery voltage should drop off and go below 4.5, the microprocessor control signal on wire 106 will go low, thereby putting a high on the gate G of the transistor switch 104 to render it non-conductive to break the flow of current from source S to drain D and wire 108. As a result, the power drained by most of the recorder components from the battery is interrupted, leaving only the memory cartridge 36 connected to the battery 32 through the wire 110 and the main switch 102, whereby the energy remaining in the battery 32 is reserved exclusively for the memory cartridge 36. This energy and the energy in the cartridge's keep-alive battery 36a will keep the cartridge data intact for an estimated year during which no further charging of the recorder battery occurs from outside sources. The keep-alive battery 36a is coupled to the power line 110 by an isolation diode 112 contained in the cartridge 36 and will keep the memory 36 alive if the main battery voltage drops below 3 volts.

Recalling that the function of the transistor switch 104 is to disconnect from the battery 32 all components of the recorder system except the memory cartridge 36 if the battery weakens to the point where its voltage drops below 4.5 volts, interruption of current flow through the transistor switch 104 will be initiated by the microprocessor 68 through its control line 106, which goes low when the battery voltage drops below a level of 4.5 volts at which the microprocessor no longer functions correctly. The actual control of the transistor switch is through a Schmitt trigger inverter 114, whose output on wire 116 to the gate G must go low to enable the transistor switch. Therefore, to enable the transistor switch 104, the two inputs to the Schmitt trigger inverter 114 on wires 118 and 119 must go high. If one or both inputs should go low, the wire 116 to the gate G will go high and disable the transistor switch 104, thereby interrupting further passage of current from the battery to the main recorder components 109, leaving only the memory cartridge 36 connected to the battery 32 through the wire 110.

At startup of the recorder, as the main switch 102 is closed, the wire 119 will go high at the left input to the Schmitt trigger inverter 114. The other input on wire 118 will be pulsed high through the capacitor 122 upon closing of the switch 102 even though the control wire 106 from the microprocessor, isolated by the resistor 124, is still low. The microprocessor will thus be supplied with power through the transistor switch 104, causing the wire 106 to go high and keep the transistor switch conductive. Now, if the battery 32 begins failing, for instance because of not being charged sufficiently, then the voltage on the microprocessor will start falling in the wire 108 and in the control wire 106. When it reaches about 4.5 volts, the microprocessor will remove the high from the control wire 106, and the transistor switch 104 will be disabled. Accordingly, with the transistor switch 104 open, all remaining power in the battery will be reserved for keeping alive the memory cartridge 36. The main battery 32 will continue to sustain the memory cartridge 36 until its voltage falls to 3 volts, the voltage of the keep-alive battery 36a. Thereafter the cartridge will be sustained solely by the keep-alive battery 36a through its isolation diode 112. Conversely, if the battery 32 should again be recharged through the network 100, the microprocessor and the other components of the recorder will not be automatically enabled again. Enabling can occur only when the wire 118 is pulsed high again, for instance by pushing a button 126 to re-enable the right hand input to the Schmitt trigger inverter 114 through the isolation diode 128.

COMPRESSING DATA FOR RECORDING

Figure 7:
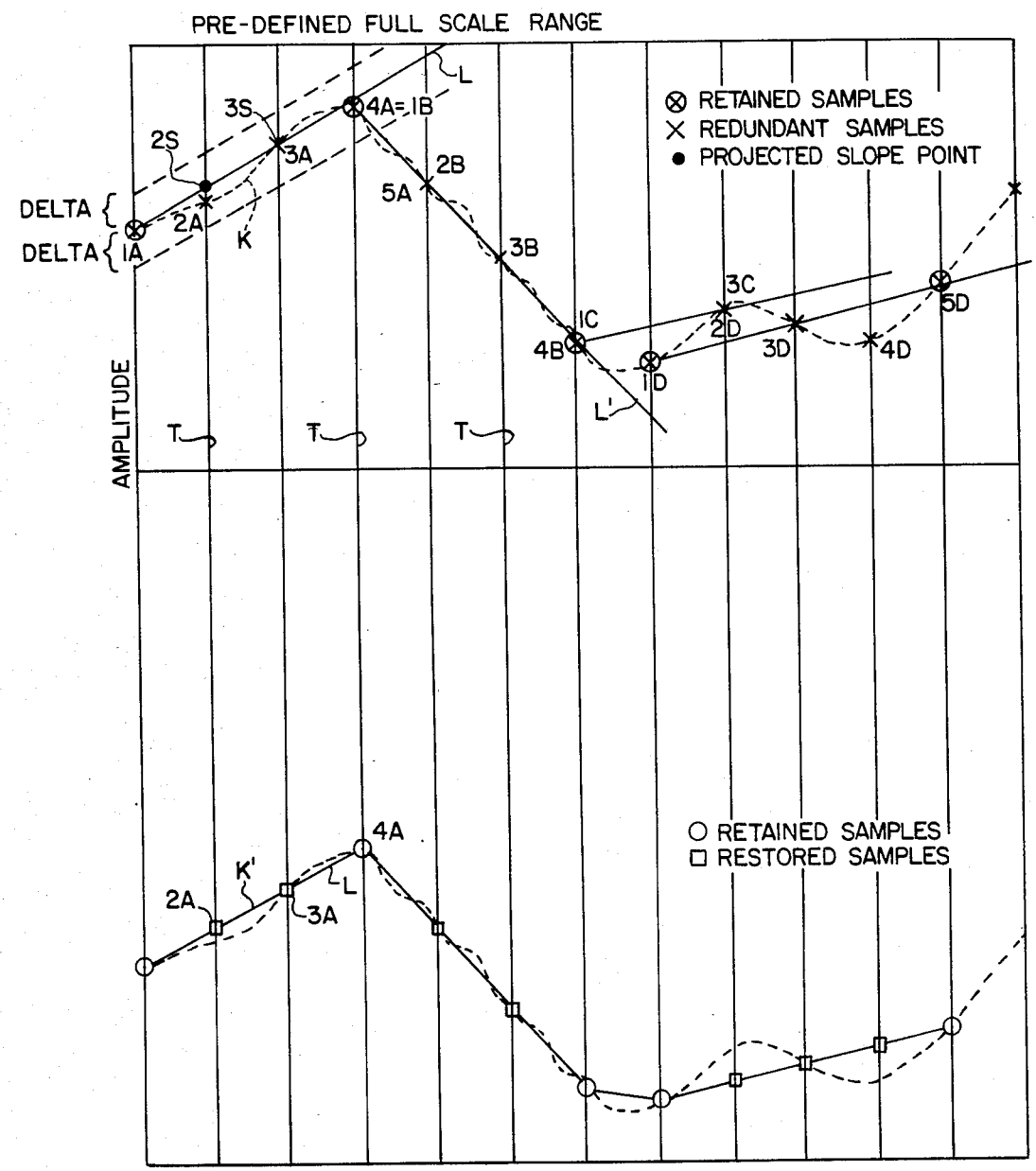
FIG. 7 shows two waveforms relating to data compression.

FIG. 7 shows as a dashed line a portion of a seismic curve K taken from the pre-event buffer which is then digitized in the analog-to-digital converter 60 prior to being compressed before formatting. Because of the fact that three different channels of seismic data are being multiplexed, the data from the three channels of the pre-event buffer are sequentially treated in blocks of four seconds duration, i.e. 800 samples which are sampled at a 200 Hz sampling rate. The data is digitized at equal sampling intervals T into data points which are initially of 12 bit resolution, having amplitudes represented vertically in the figure. Each block of data points is then gain-ranged, i.e. scaled, so that the largest data sample in the block is greater than half of a pre-defined full-scale range as shown in FIG. 7, but less than full range. After gain-ranging, the most significant 8 bits of each sample are retained in preparation for compressing and recording.

The compression concept is based upon the idea that many of the data points can be considered redundant, and therefore need not be recorded, while the reduced number of points recorded will still permit the signature of curve K of the signal to be reproduced within acceptable limits as shown by the curve K' in FIG. 7. The technique for determining and eliminating redundant data points uses an approach wherein the slope L of a segment of the signature curve K between two retained points is defined as the amplitude change between the bytes of the two retained points divided by the number of intervening sampling intervals. This slope is determined beginning at an initial starting point 1A on the curve K. The curve is then approximated by projecting it along a linear slope extending to a third point 3A, and by dividing the difference in amplitude 3A−1A by two sampling intervals. The determination as to whether a second data point 2A is or is not redundant is done by making a comparison of the amplitude of the byte at the the second data point 2A with the amplitude of corresponding projected slope point 2S to determine whether its amplitudes falls within the plus-or-minus increment "delta". As long as each compared data point is within delta the point is considered redundant and its data is not recorded, but the redundancy count is incremented. When, finally, a point 5A exceeds delta, it is deemed non-redundant and the redundancy count is decremented because in order to record the last point 4A falling on the slope L the system must be backed up from point 5A to point 4A. The redundancy count of three comprising the number of intervening sampling intervals is therefore recorded. The most recently recorded point, 4A in this case, becomes the first starting point for purposes of determining a new slope L' using points 4A and 3B. This process continues until the block of 800 points has been fully processed for compression, and then a new 800 point block representing a different (multiplexed) seismometer channel is input for purposes of compression, followed after that by another block representing the third seismometer channel, and so on.

Figure 8:
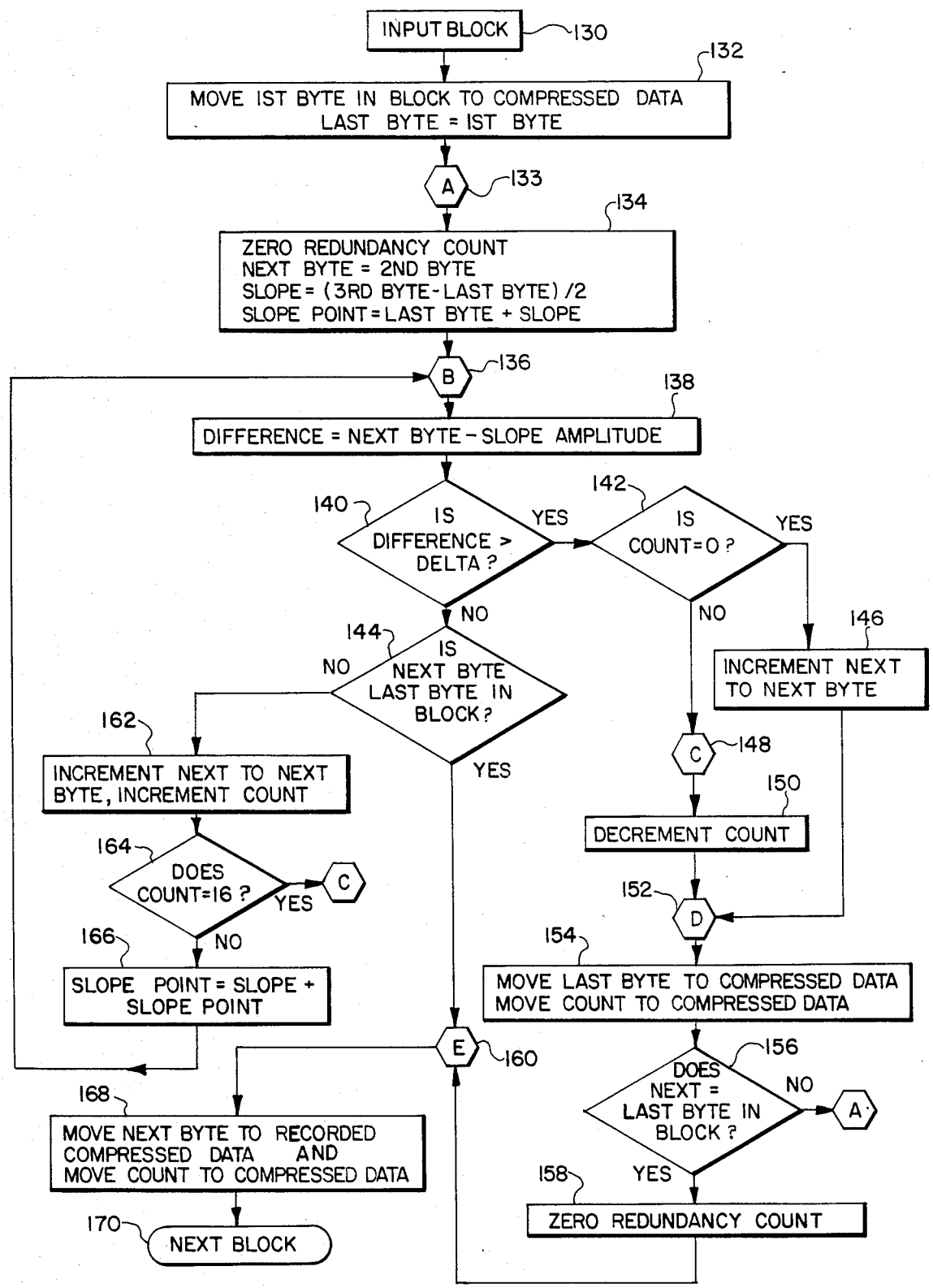
FIG. 8 shows a flow diagram of the steps involved in the data compression process of the invention.

FIG. 8 shows a flow diagram for the data compression steps. The first step 130 is to input data points of the next block representing amplitudes on the curve K. Assuming that a last byte has previously been recorded, either from the same block or from the preceeding block representing the same seismometer channel, this point is selected in step 132 for purposes of establishing a first byte to determine a first slope L for the present block. In the next step 134 the redundancy count is set to zero, a second point byte 2A is selected, and a third point byte 3A is selected. A slope for a line L to be projected is determined by differencing the amplitude of the first point byte 1A and the amplitude of the third point byte 3A and dividing by two intervening sampling intervals. An artifical slope point 2S then becomes equal to the last byte 1A plus the slope. Slope point 2S projected from point 1A lies on slope line L. Then the point byte 2A has its amplitude compared in step 138 with the amplitude limits about point 2S, i.e. plus and minus delta along the corresponding sampling interval T to determine the value of the numerical difference. This difference is then compared with delta in step 140 to determine whether its absolute value is greater than delta.

If the response is NO, then in step 144 a determination is made as to whether the next byte 3A will be the last byte in the block. If YES, then the last byte is always recorded as a compressed data point, step 168, and the system begins the next block in step 170. If NO, i.e. not the last byte in the block, step 162 increments the program to compare the next byte 3A and to increment the count of the intervening sampling steps, i.e. to a count of one in the case of point 2A. If this count is 16, then in step 164, the program goes to C, step 148, and the point byte corresponding with the count of 16 will be recorded as hereinafter more fully discussed beginning at C, step 148, since counts greater than 16 are arbitrarily prevented. However, in step 164 if the count is not 16, another slope point 3S is projected by adding the slope to the last slope point 2A, as indicated in step 166, and the program returns to B, step 136, to test the next input byte 3A, which will be within delta since it established the slope L. The steps then proceed through testing of the point 4A until a point 5A fails to fall within delta.

For point 5A, at step 140, the difference in amplitudes between data at point 5A and L will exceed delta, and the program will go to step 142. At step 142 a determination will be made as to whether the count is equal to zero. In this example it is not. The count at point 5A is four. Moreover, since point 5A is outside delta, it will be necessary to go back and record point 4A since this is the last point that is within delta on the slope L. Therefore, going through C at step 148, the count of four will be decremented at step 150 so that it becomes three, i.e. the number of intervening sampling intervals between points 1A and 4A. Then at step 154 the last byte 4A before 5A will be recorded as compressed data and its redundancy count of three will be recorded. Conversely, if YES, i.e. the count equals zero in step 142, the count would have been incremented at step 146 to the count of four corresponding with point 5A. However, since at step 140 it was determined that the difference exceeded delta, at step 154 the last byte 4A was recorded along with the corresponding redundancy count of three. At step 156 determination is then made as to whether the next byte would be the last byte in the block. If YES, the redundancy count is then set to zero and the last byte in the block would also be recorded at step 168 via step E at 160, since no further compression is possible in that block. However, if in step 156 it is determined that the next byte will not be the last byte in that block, then the program returns to point A, step 133, and beings again by establishing a new slope using point 3B and 4A (which is also point 1B), and by projecting a new slope point and comparing the next data point byte with the new slope point in step 138, etc.

When the data has been thus recorded, it can be restored to produce the curve K' as shown below in FIG. 7 wherein it is assumed that all the non-recorded data points which were found to be redundant lie near the slopes between those points that were recorded. For instance points 2A and 3A lie on the slope L between the recorded data points 1A and 4A, etc.

The selected value of delta will determine the fidelity with which the curve K' when restored will match the curve K of the original waveform. If delta is selected too small, then little saving will be had in the number of data bytes that are required to be stored. On the other hand, if delta is selected too large, the data can not be adequately restored. Whatever delta is selected, the amount of data reduction possible is least at high amplitudes and at higher frequencies, and is maximum for curves having low amplitudes and having only lower frequency components that must be restored. The spacing between points on the curve is of course determined by the sampling rate during digitizing of the analog data.

The compressed data and the redundancy counts are formatted for recording in the memory cartridge 36 in eight-bit bytes. Three bytes are required for two eight-bit recorded data samples. Each eight-bit redundancy count byte includes two redundancy counts of four bits each, i.e. 0–15 (HEX F), and this is of course the reason why the redundancy count is not allowed to exceed the pre-established number 16. The most significant four bits of a redundancy count byte represents the number of sampling intervals between the first recorded eight-bit data sample and the second recorded sample. The least significant four bits of a redundancy count byte represent the number of sampling intervals between the second recorded eight-bit data byte and the next non-redundant sample to be recorded, and so on.

This invention is not to be limited to the exact embodiments illustrated in the drawings and described in the specification, for changes may be made therein within the scope of the following claims.

We claim:

1. A digital recorder system for recording digital representations of portions of a continuously variable waveform which portions are of interest because they have amplitudes that exceed a preset threshold level, and for leaving unrecorded other non-interesting portions of the continuous waveform whose amplitudes fail to exceed said threshold level, the recorder comprising:
   (a) signal input means;
   (b) periodic amplitude sampling means operative to sample the amplitude of the input signal waveform from said input means at uniformly spaced sampling intervals to produce sample point data;
   (c) data processing means including a microprocessor and programmable read only memory (PROM) means operative to program the microprocessor to format said point data for subsequent recording, and the processing means further including recording timing means;
   (d) a digital electronic pre-event buffer having an output and having an input connected to receive continuously all of the formatted point data, which is entered into it under control of the microprocessor, newly entered data displacing from said output of the buffer previously entered data;
   (e) a digital electronic permanent memory having data recording capacity larger than the capacity of the pre-event buffer, the memory being operative to receive and permanently store point data;
   (f) the processing means further including means for comparing with said threshold level with the input signal amplitude level represented by each data point entered at the input of the pre-event buffer, and the microprocessor then entering for storage in said permanent memory all point data which is displaced from the buffer output continuously for as long as said threshold level is exceeded at the input plus an interval of time determined by said timing means and commencing when the input amplitude level falls below said threshold level,
   (g) whereby a digital representation of the continuously variable waveform is permanently stored in the memory from a time beginning prior to its input amplitude exceeding said threshold level and extending through said timing interval after the input amplitude fails to exceed said threshold level.

2. The digital recorder system as claimed in claim 1, wherein said signal input means comprises seismometer means having an output; amplifier and low pass filter means connected to the seismometer means output; analog to digital converter means connected to the amplifier and filter means, and the converter means being controlled by the microprocessor to sample the filtered and amplified output of the seismometer means at said sampling intervals.

3. The digital recorder system as claimed in claim 2, further including a calibration generator coupled to displace the seismometer means by generating and inserting a signal thereinto, the calibration generator comprising data clock pulse means; shift clock pulse means of lower frequency; a shift register receiving these pulses respectively at its clock and "D" terminals and the register having multiple outputs coupled to an amplifier by resistors having values operative to deliver to the amplifier a stepped wave of approximately sinusoidal contour, the clock pulse rates being selected to generate a wave whose stepping rate is high as compared with the passband of the filter and whose sinusoidal reversal rate is of a frequency within the passband.

4. The digital recorder system as claimed in claim 2, further comprising multiple manual switch means operative to encode and enter information into the microprocessor for recording along with the data, said switch means including means for encoding and entering an identification of the digital recorder, and including means for encoding and entering the level of said threshold, and including means for encoding and entering a signal amplitude reference for setting and indicating the seismometer amplifier sensitivity, and including means for encoding and entering the duration of time for recording data from the buffer after the level represented by the data fails to exceed the threshold, and including means for entering into the microprocessor an encoded signal for setting the digital sampling rate.

5. The digital recorder system as claimed in claim 1, wherein said signal input means comprises three orthogonally disposed seismometers having outputs in separate channels; amplifier and low pass filter means connected in each channel to receive the output of a seismometer; an analog to digital converter for digitizing signals passing therethrough to deliver said point data; multiplexer means operative under the control of the microprocessor to connect the amplifier and filter outputs of the three channels sequentially to the analog to digital converter; the pre-event buffer and the memory respectively having three storage and recording channels, and the digitized point data for each seismometer channel being delivered and entered by the microprocessor into the corresponding storage and recording channels in synchronism with the multiplexer means.

6. The digital recorder system as claimed in claim 1, further comprising an accurate real time generating means operative to generate real time codes; means coupling the real time codes to the microprocessor, the microprocessor having means for adding the real time codes to the data being formatted and for recording the real time codes therewith; and said real time generating means including means for synchronizing the generating means with received standard time signals to maintain real time accuracy.

7. The digital recorder system as claimed in claim 1, further including a serial data access port coupled to the microprocessor, and the microprocessor having means for reading out from the access port the recorded contents of the memory.

8. The digital recorder system as claimed in claim 1, wherein said digital electronic memory comprises a cartridge module removably coupled to the recorder system; and keep-alive battery means in the cartridge for maintaining data recorded therein when the cartridge is removed from the recorder system.

9. The digital recorder system as claimed in claim 1, further including a main power supply for the recorder having a main storage battery; means to recharge the storage battery; switch means normally connecting the storage battery to the recorder including the signal input means, the pre-event buffer, and the data processing means, but the switch means being operative under the control of the microprocessor for automatically disconnecting the recorder from the battery if the battery voltage falls below a predetermined voltage; and the digital electronic memory being connected directly to the storage battery whereby upon partial failure of the storage battery, the only component remaining in the recorder system which is still connected to the battery is the electronic memory.

10. The digital recorder system as claimed in claim 1, wherein the data processing means for formatting point data for recording also compresses the data and includes analog to digital converter means for digitizing the input signal to provide data points taken at uniformly spaced sampling intervals; said data processing means further including means for recording a data point representing a starting point; PROM means associated with the microprocessor for establishing a linear slope approximating the slope of the signal between a recorded starting point and a subsequently sampled data point, and for establishing tolerances on either side of the linear slope but offset therefrom by fixed predetermined limits; and PROM means for testing data points following said starting point to determine whether they fall near said linear slope and within said tolerance limits, said microprocessor recording in said memory a second data point representing the last of said following points to fall within said limits and further recording in said memory a redundancy count number equal to the number of points falling within said limits and located between said recorded starting point and said last recorded point; and each recorded second data point representing the end point of a portion of the waveform and also comprising a starting point for the next portion of the waveform.

11. The digital recorder system as claimed in claim 1, wherein said signal input means further comprises seismometer means and amplifier and filter means, and analog to digital converter means; a housing having a lower housing member having a bottom and side walls and having a partition plate closing and sealing said lower housing member; said seismometer means, amplifier and filter means, converter means, data processing means, and the digital pre-event buffer being housed and sealed within the lower housing member; and the housing having an upper housing member having top and side walls shaped to mate with and cover the lower housing member at the partition plate, the upper member being vented to the atmosphere; means for securing the housing members together; power supply and battery means for powering the recorder system mounted in the upper housing member; and the digital electronic memory comprising a cartridge module removably coupled to the microprocessor and housed in the upper housing member for easy access and removal when the upper housing member is separated from the sealed lower housing member.

12. A seismic recorder system including seismometer means, digitizing means for digitizing data from the seismometer means, electronic temporary buffer means for receiving the digitized data, main electronic memory cartridge means, a power supply, and microprocessor means for controlling the recorder system, comprising:

(a) upper and lower mating housing members defining upper and lower compartments;
(b) the lower compartment mounting the seismometer means, the digitizing means, the electronic temporary buffer means, and the microprocessor means, and having a partition thereabove hermetically sealing the lower housing member; and
(c) a vented upper housing member overlying the lower housing member and the partition, and the upper housing member containing the power supply and the main memory cartridge means removably mounted therein.

13. The method of compressing and digitally recording varying continuous waveforms including the steps of:

(a) sampling the amplitudes of a waveform at a series of sampling points which are spaced by uniform sampling intervals, and digitizing the amplitude at each point to provide spaced data points;
(b) recording data representing a starting point;
(c) establishing a linear slope approximating the slope of the waveform as it extends from said recorded starting point to a selected subsequent sampling point of the waveform, and establishing amplitude tolerances above and below the linear slope and offset therefrom by fixed predetermined plus-and-minus amplitude limits;
(d) testing subsequent sampling points following said starting point to determine whether their amplitudes fall near said linear slope and within said tolerance limits, and recording data representing the last of said subsequent points on the waveform to fall within said limits, and recording a redundancy count number equal to the number of intervening sampling point intervals corresponding with unrecorded points falling within said limits and located between said recorded starting point and said last recorded point, and
(e) repeating steps (c) and (d) using each last recorded point as a new starting point.

14. The method as claimed in claim 13, wherein the step of establishing a linear slope includes the step of determining the slope of a line passing through a first starting point and through a subsequent third point arrived at by skipping an intervening second point; and wherein the step of testing subsequent points includes testing said intervening second point to determine whether its amplitude falls near said linear slope and within said tolerance limits; and if its amplitude is outside said limits, recording said second point and using it as a new starting point to repeat steps (c) and (d).

15. The method as claimed in claim 13, wherein said varying waveforms are compressed and recorded in different recording channels, including the further steps of dividing said waveforms into successive blocks of data wherein each block contains a predetermined number of data points; and compressing the data in the data blocks while sequentially multiplexing the blocks and alternating between the waveforms.

16. The method as claimed in claim 15, wherein the last data point in each block is always recorded, and each recorded last data point comprises the starting point for establishing a linear slope for the next sequential block respresenting the same waveform.

17. The method as claimed in claim 13, further including the step of comparing the redundancy count with a pre-established maximum permissible count number, and recording the corresponding data point whenever the redundancy count reaches said pre-established number.

* * * * *